No. 654,523. Patented July 24, 1900.
A. B. CRITZER.
EYEGLASSES.
(Application filed Mar. 13, 1900.)
(No Model.)
Fig. 1.
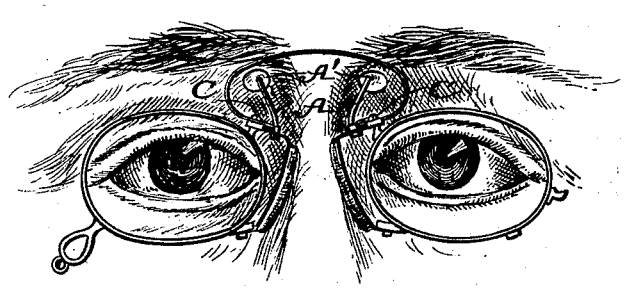
Fig. 7.
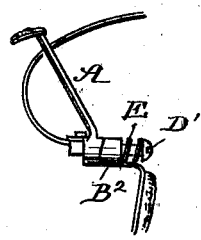
Fig. 2.
Fig. 3.
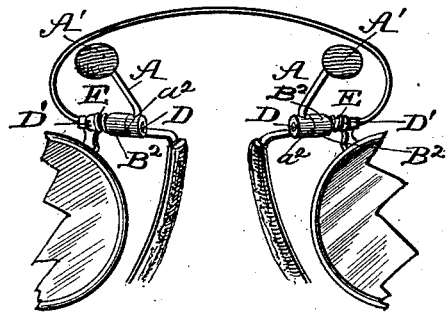
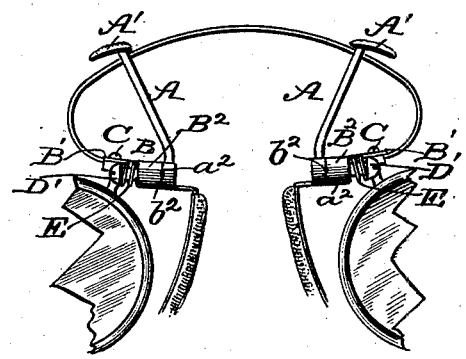
Fig. 8.
Fig. 4.
Fig. 5.
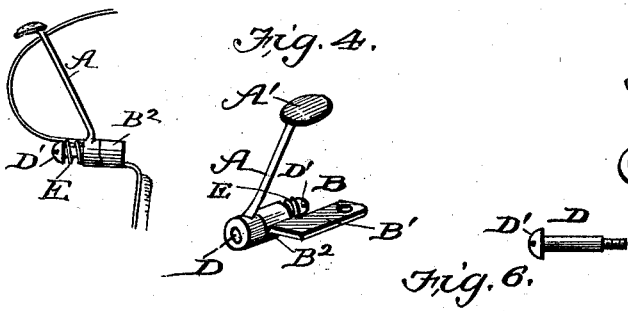
Fig. 6.
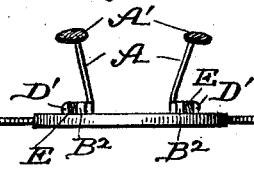
WITNESSES:
Jos. A. Ryan
Perry B. Turpin.
INVENTOR
A. B. Critzer.
BY Munn & Co.
ATTORNEYS

UNITED STATES PATENT OFFICE.

AUGUSTUS BARBER CRITZER, OF SAN ANTONIO, TEXAS, ASSIGNOR TO CRITZER BROTHERS, OF SAME PLACE.

EYEGLASSES.

SPECIFICATION forming part of Letters Patent No. 654,523, dated July 24, 1900.

Application filed March 13, 1900. Serial No. 8,486. (No model.)

*To all whom it may concern:*

Be it known that I, AUGUSTUS BARBER CRITZER, of San Antonio, in the county of Bexar and State of Texas, have invented a new and useful Improvement in Eyeglasses, of which the following is a specification.

My invention is an improvement in eyeglasses; and it consists in certain novel constructions and combinations of parts, as will be hereinafter described and claimed.

In the drawings, Figure 1 is a front view of my invention as in use. Fig. 2 is a detail perspective view of a pair of eyeglasses provided with my improvements, parts of the glasses being broken away and the anchors being adjusted to position for use. Fig. 3 is a face view with the anchors folded. Fig. 4 is a detail perspective view illustrating one of the anchors and its supporting devices. Fig. 5 illustrates the parts in detail. Fig. 6 is a top plan view of a pair of eyeglasses with the anchors adjusted to position for use, and Figs. 7 and 8 show modified arrangements of some of the parts.

The glasses, their frames, &c., may be of any desired form or pattern, as my invention is not confined in its application to any particular style of glasses, but can be applied to any style, either during the manufacture of the glasses or after they are made and placed on the market. The glasses shown in the accompanying drawings are simply employed to aid in illustrating the application and use of my invention.

The invention as shown includes retaining devices connected with the eyeglasses and arranged to bear under the frontal bones above the eyes. This serves two important purposes. In the first place it prevents the glasses from slipping up on the nose, and thereby obviates that "squinting" sensation of which so many eyeglass-wearers complain, by preventing the pinching up of the skin of the nose. The retaining devices also, when once properly adjusted, will steady the eyeglasses on the face and insure their being brought to the same position before the eye every time, which should prove beneficial in cases of astigmatism and in other special cases.

Ordinarily the tendency of glasses to slip up off the nose operates to loosen the glasses, while the retaining device utilizes this tendency to hold the glasses more securely in place. While many a person cannot wear eyeglasses because the nose is not adapted for them, my improvement can be worn by all, as the nose simply forms a rest for the glasses and they are anchored between such rest and the frontal bone above the eyes.

In the construction shown and which may for convenience be preferred the device includes two anchor-bars A A, which may be similar, except that they are rights and lefts. These anchor-bars are arranged on opposite sides of the central line of the eyeglasses in their adjustment for use, are inclined upwardly and rearwardly from their respective glasses, and are adapted at their free ends to bear in the sockets under the frontal bone on opposite sides of the upper part of the bridge of the nose and above the eyes. This is preferably effected by providing the free ends of the anchor-bars with broadened pad-like portions A' to rest against the face. By preference the supports for the anchor-bars are in fixed relation to their respective glasses or lenses, so that the anchor-bars may always when adjusted for use preserve the same relation to their said glasses, and manifestly the anchor-bars might be fixed and immovable in the position for use shown in Figs. 2 and 6; but it is preferred to make the said bars foldable, so they can be adjusted to the position shown in Fig. 3 for convenience in incasing them, and particularly to adapt the glasses having my improvements to be carried in any of the ordinary flat cases in common use.

In carrying out the folding feature of my invention I provide for each anchor-bar A a support in the form of a bracket B, (shown in Fig. 5,) having a plate B', which may be secured in place by the screw C, that holds the lens-frame in place, or the said plate B' may be secured to the eyeglass in any other suitable manner. The bracket B is also provided with a tubular journal $B^2$, carried by the plate B' and arranged in rear of the eyeglasses, with its bore extended from side to side or at right angles to the axes of the lenses. These journals receive the bolts D, having heads D' at their outer ends and their inner ends projecting beyond the inner ends of the journals and receiving the lower ends of the anchor-bars A, the anchor-bars being secured by threading the bolts in them or in any other suitable way, as desired. Springs E bear between the journals $B^2$ and the heads D' of the bolts and draw the anchor-bars firmly against the inner ends of the journals to hold the anchor-bars in any desired adjustment. Such inner ends of the journals $B^2$ are preferably notched at $b^2$ to receive spur-like projections $a^2$ on the anchor-bars, and thus operate as gages to stop the said anchor-bars in the proper position for use.

The construction is simple, inexpensive, can be readily manufactured with the frames or applied to those already on the market, and when once adjusted to the face of the wearer needs no further attention.

Manifestly my improvement is susceptible of changes and modifications without departing from the principle of the invention. Thus in Figs. 7 and 8 are shown different arrangements whereby the device is adapted to properly fit the eyes of a person. As some persons are wider between the eyes than others it may of course prove important to provide for properly fitting the eyeglasses to them. In the construction shown in Fig. 7 the anchor is arranged outside the journal of the bracket and the spring encircles the shaft at the inner side of the bracket, while in Fig. 8 the journal of the bracket is set nearer the nose-pad of the glasses and the spring encircles the outer end of the shaft.

Having thus described my invention, what I claim as new, and desire to secure by Letters Patent, is—

1. In an attachment for eyeglasses the combination of the journal, the anchor-bar, the bolt or shaft securing said bar to said journal, and the spring acting upon said bar to secure the same in any desired position substantially as set forth.

2. An attachment for eyeglasses comprising the bracket having a journal provided in its end with a notch, the anchor-bar having a spur to enter such notch, the bolt or shaft securing said bar to the journal, and the spring for actuating the anchor-bar to set its spur into engagement with the notch of the journal substantially as set forth.

3. An attachment for eyeglasses comprising the bracket having a journal, a shaft in said journal, and an anchor-bar on said shaft alongside said journal and having means by which to positively interlock with the journal substantially as set forth.

4. An attachment for eyeglasses comprising an anchor-bar arranged at one end to bear under the frontal bone above the eye and pivotally supported at its other end, a relatively-fixed portion adjacent to the anchor-bar and a spring acting upon said anchor-bar to press it against such fixed portion whereby to secure it in any desired adjustment.

5. An attachment for eyeglasses comprising the journal, the shaft in said journal, the spring on said shaft and the anchor-bar carried by the shaft substantially as set forth.

In testimony whereof I have signed my name to this specification in the presence of two subscribing witnesses.

AUGUSTUS BARBER CRITZER.

Witnesses:
C. G. WYNNE,
PAUL O'BRIEN.